United States Patent
Wilson

(10) Patent No.: US 6,306,030 B1
(45) Date of Patent: Oct. 23, 2001

(54) SOLAR-POWERED VENTILATION SYSTEM FOR A BUILDING STRUCTURE

(76) Inventor: Glen H. Wilson, 4514 Lockwood, Wichita Falls, TX (US) 76308

( * ) Notice: Subject to any disclaimer, the term of this patent is extended or adjusted under 35 U.S.C. 154(b) by 0 days.

(21) Appl. No.: 09/480,529

(22) Filed: Jan. 7, 2000

(51) Int. Cl.$^7$ ............................................. F23L 17/02
(52) U.S. Cl. ........................................ 454/16; 454/900
(58) Field of Search ........................... 454/16, 18, 900, 454/15, 10, 12

(56) References Cited

U.S. PATENT DOCUMENTS

| | | |
|---|---|---|
| D. 380,044 | 6/1997 | Tobias . |
| 1,965,171 * | 7/1934 | Boyer .................................... 454/16 |
| 3,590,720 * | 7/1971 | Siegal .................................... 454/16 |
| 4,051,769 * | 10/1977 | Nickerson et al. ................... 454/16 |
| 4,085,667 | 4/1978 | Christianson . |
| 4,432,273 * | 2/1984 | Devitt .................................... 454/16 |
| 4,804,140 | 2/1989 | Cantrell . |
| 4,939,986 | 7/1990 | Turner . |
| 5,078,047 | 1/1992 | Wimberly . |
| 5,131,888 | 7/1992 | Adkins . |
| 5,326,313 * | 7/1994 | Miniat .................................... 454/18 |

* cited by examiner

Primary Examiner—Harold Joyce
Assistant Examiner—Derek S. Boles

(57) ABSTRACT

A solar-powered ventilation system for a building structure for ventilating building structures even during no wind days. The solar-powered ventilation system for a building structure includes a building structure having a roof and a conduit member extending through the roof inside the building structure; and also includes a turbine member being securely mounted to the building structure over the conduit member and having a centrally-rotating spindle and a plurality of curved vanes securely attached to and spaced about the spindle; and further includes solar panels securely mounted to a top of the conduit member and upon which the turbine member is rotatably mounted, a motor connected to the spindle for the rotation thereof, and a battery connected to the motor and to the solar panels for storing electrical energy and for energizing the motor.

11 Claims, 1 Drawing Sheet

SOLAR-POWERED VENTILATION SYSTEM FOR A BUILDING STRUCTURE

BACKGROUND OF THE INVENTION

1. Field of the Invention

The present invention relates to a solar-powered turbine and more particularly pertains to a new solar-powered ventilation system for a building structure for ventilating building structures even during no wind days.

2. Description of the Prior Art

The use of solar-powered turbine is known in the prior art. More specifically, solar-powered turbine heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,078,047; 4,085,667; 5,131,888; 4,804,140; 4,939,986; and Des. 380,044.

While these devices fulfill their respective, particular objectives and requirements, the aforementioned patents do not disclose a new solar-powered ventilation system for a building structure. The inventive device includes a building structure having a roof and a conduit member extending through the roof inside the building structure; and also includes a turbine member being securely mounted to the building structure over the conduit member and having a centrally-rotating spindle and a plurality of curved vanes securely attached to and spaced about the spindle; and further includes solar panels securely mounted to a top of the conduit member and upon which the turbine member is rotatably mounted, a motor connected to the spindle for the rotation thereof, and a battery connected to the motor and to the solar panels for storing electrical energy and for energizing the motor.

In these respects, the solar-powered ventilation system for a building structure according to the present invention substantially departs from the conventional concepts and designs of the prior art, and in so doing provides an apparatus primarily developed for the purpose of ventilating building structures even during no wind days.

SUMMARY OF THE INVENTION

In view of the foregoing disadvantages inherent in the known types of solar-powered turbine now present in the prior art, the present invention provides a new solar-powered ventilation system for a building structure construction wherein the same can be utilized for ventilating building structures even during no wind days.

The general purpose of the present invention, which will be described subsequently in greater detail, is to provide a new solar-powered ventilation system for a building structure which has many of the advantages of the solar-powered turbine mentioned heretofore and many novel features that result in a new solar-powered ventilation system for a building structure which is not anticipated, rendered obvious, suggested, or even implied by any of the prior art solar-powered turbine, either alone or in any combination thereof.

To attain this, the present invention generally comprises a building structure having a roof and a conduit member extending through the roof inside the building structure; and also includes a turbine member being securely mounted to the building structure over the conduit member and having a centrally-rotating spindle and a plurality of curved vanes securely attached to and spaced about the spindle; and further includes solar panels securely mounted to a top of the conduit member and upon which the turbine member is rotatably mounted, a motor connected to the spindle for the rotation thereof, and a battery connected to the motor and to the solar panels for storing electrical energy and for energizing the motor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new solar-powered ventilation system for a building structure which has many of the advantages of the solar-powered turbine mentioned heretofore and many novel features that result in a new solar-powered ventilation system for a building structure which is not anticipated, rendered obvious, suggested, or even implied by any of the prior art solar-powered turbine, either alone or in any combination thereof.

It is another object of the present invention to provide a new solar-powered ventilation system for a building structure which may be easily and efficiently manufactured and marketed.

It is a further object of the present invention to provide a new solar-powered ventilation system for a building structure which is of a durable and reliable construction.

An even further object of the present invention is to provide a new solar-powered ventilation system for a building structure which is susceptible of a low cost of manufacture with regard to both materials and labor, and which accordingly is then susceptible of low prices of sale to the consuming public, thereby making such solar-powered ventilation system for a building structure economically available to the buying public.

Still yet another object of the present invention is to provide a new solar-powered ventilation system for a building structure which provides in the apparatuses and methods of the prior art some of the advantages thereof, while simultaneously overcoming some of the disadvantages normally associated therewith.

Still another object of the present invention is to provide a new solar-powered ventilation system for a building structure for ventilating building structures even during no wind days.

Yet another object of the present invention is to provide a new solar-powered ventilation system for a building structure which includes a building structure having a roof and a conduit member extending through the roof inside the building structure; and also includes a turbine member being securely mounted to the building structure over the conduit member and having a centrally-rotating spindle and a plurality of curved vanes securely attached to and spaced about the spindle; and further includes solar panels securely mounted to a top of the conduit member and upon which the turbine member is rotatably mounted, a motor connected to the spindle for the rotation thereof, and a battery connected to the motor and to the solar panels for storing electrical energy and for energizing the motor.

Still yet another object of the present invention is to provide a new solar-powered ventilation system for a building structure that is very inexpensive to operate.

Even still another object of the present invention is to provide a new solar-powered ventilation system for a building structure that essentially and conveniently extracts stale air from inside the building structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
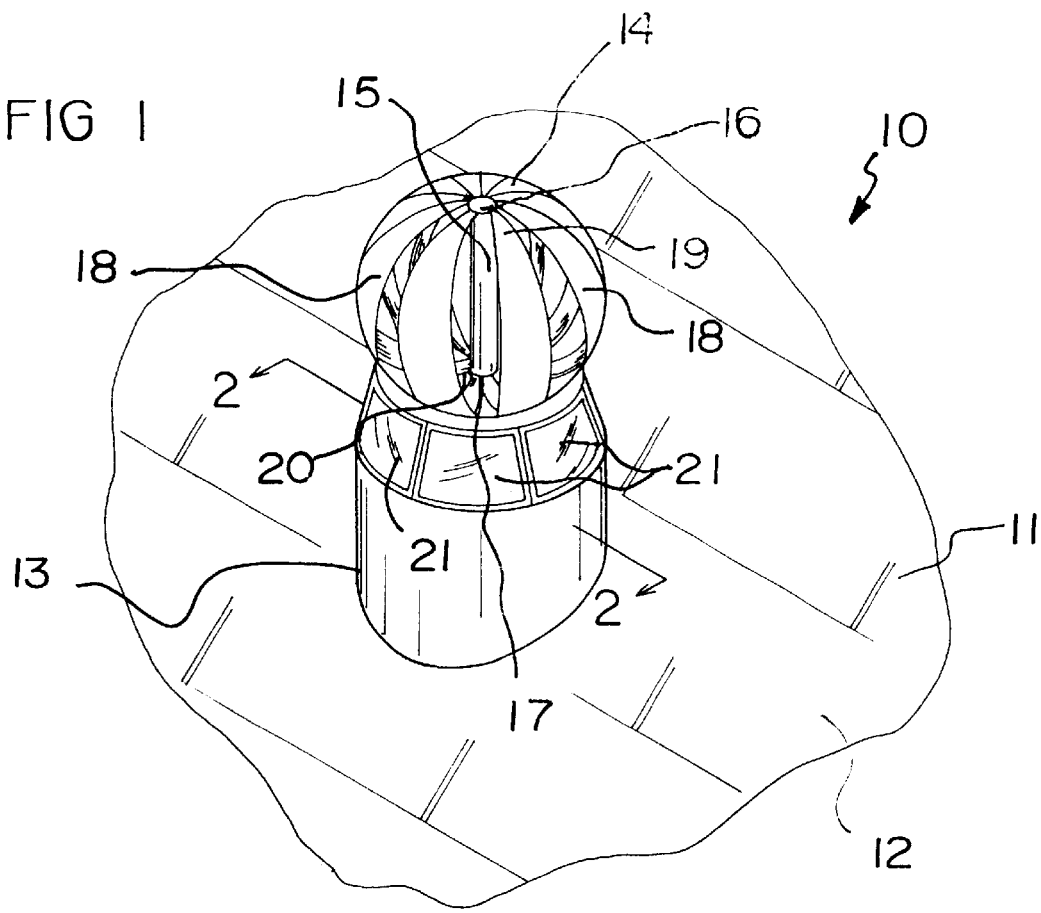
FIG. 1 is a perspective view of a new solar-powered ventilation system for a building structure according to the present invention.
Figure 2:
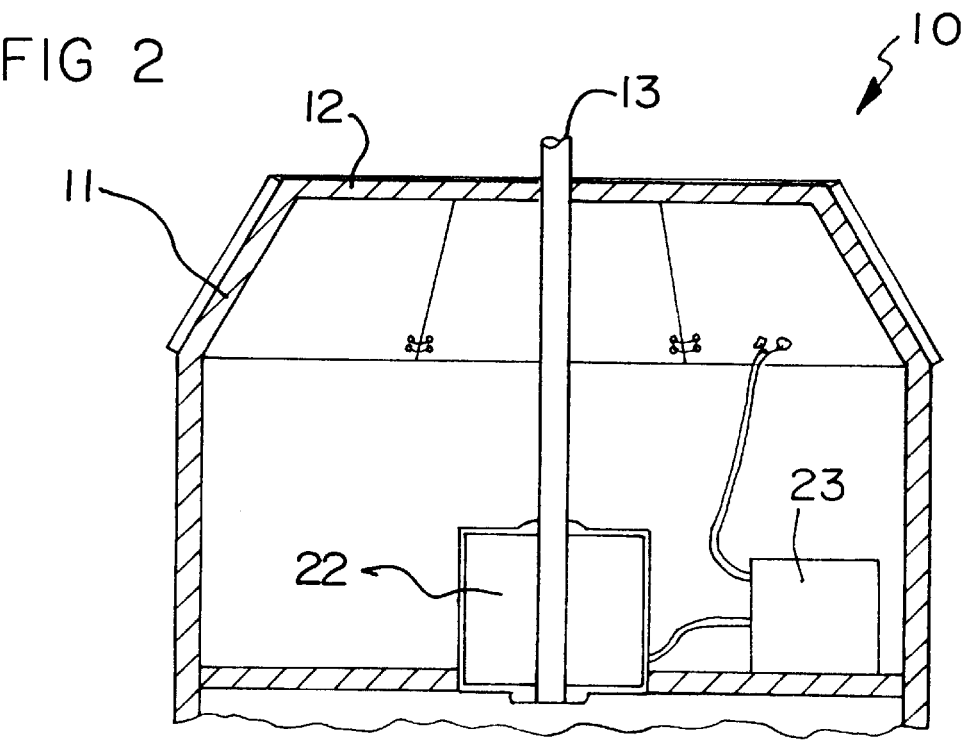
FIG. 2 is a side cross-sectional view of the present invention.

With reference now to the drawings, and in particular to FIGS. 1 through 2 thereof, a new solar-powered ventilation system for a building structure embodying the principles and concepts of the present invention and generally designated by the reference numeral 10 will be described.

As best illustrated in FIGS. 1 through 2, the solar-powered ventilation system for a building structure 10 generally comprises a building structure 11 having a roof 12 and a conduit member 13 extending through the roof and having an opening therethrough, and further comprises a turbine member 14 having a central rotating spindle 15 and a plurality of curved vanes 18 securely attached and welded to and spaced about the spindle 15. The turbine member 14 is securely and conventionally mounted with brackets upon the roof 12 over the conduit member 13. The spindle 15 is disposed so as to rotate about a vertical axis. The turbine member 14 is shaped like that of a spherical object having a top pole 16 and a bottom pole 17. Each of the vanes 18 has a first end 19 which is securely attached and welded to the top pole 16 and further has a second end 20 which is securely attached and welded to the bottom pole 17. The vanes 18 are curved from the top pole 16 to the bottom pole 17 and essentially form the body of the spherical object. A means to drive the turbine member 14 using solar energy includes a plurality of solar panels 21 securely and conventionally mounted to a top of the conduit member 13 for converting solar energy into electrical energy; and also includes a motor 22 conventionally connected to the spindle 15 of the turbine member 14; and further includes a battery 23 connected with wires to the motor 22 for energizing the motor and also conventionally connected to the solar panels 21 for storing electrical energy. The turbine member 14 is rotatably and securely and conventionally mounted upon the solar panels 21.

In use, the solar panels 21 converts the rays of the sun to electrical energy which is stored in the battery 23 which, in turn, energizes the motor 22 which rotates the spindle 15 thus creating an air flow into the building structure 11 through the conduit member 13.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solar-powered ventilation system for a building structure comprising:

a building structure having a roof;

a conduit member extending upwardly from said roof and having an opening therethrough, the conduit member having an upper portion and a lower portion, the upper portion having a substantially frusta-conical shape, the lower portion having a substantially cylindrical shape;

a turbine member having a central rotating spindle and a plurality of curved vanes securely attached to and spaced about said spindle, said turbine member being securely mounted upon said roof over said conduit member; and a means to drive said turbine member using solar energy including a plurality of solar panels mounted on an outer surface of the upper portion of said conduit member.

2. A solar-powered ventilation system for a building structure as described in claim 1, wherein said spindle is disposed so as to rotate about a central axis of said conduit member.

3. A solar-powered ventilation system for a building structure as described in claim 1, wherein said means to drive said turbine member using solar energy includes a motor connected to said turbine member; and a battery connected to said motor for energizing said motor and connected to said solar panels for storing electrical energy.

4. A solar-powered ventilation system for a building structure as described in claim 1, wherein said turbine member has a substantially spherical shape having a top pole and a bottom pole.

5. A solar-powered ventilation system for a building structure as described in claim 4, wherein each of said vanes has a first end which is securely attached to said top pole and further has a second end which is securely attached to said bottom pole, said vanes being curved from said top pole to said bottom pole and essentially forming a body of said turbine member.

6. A solar-powered ventilation system for a building structure as described in claim 1, wherein said turbine member is rotatably mounted on said conduit member above said solar panels.

7. A solar-powered ventilation system for a building structure comprising:

a building structure having a roof;

a conduit member extending upwardly from said roof and having an opening therethrough, the conduit member having an upper portion and a lower portion, the upper portion having a substantially frusta-conical shape, the lower portion having a substantially cylindrical shape, a perimeter wall of the upper portion of said conduit member being positioned at an angle of approximately 30 degrees with respect to a perimeter wall of the lower portion of said conduit member;

a turbine member having a central rotating spindle and a plurality of curved vanes securely attached to and spaced about said spindle, said turbine member being securely mounted on and above said conduit member, said spindle being disposed so as to rotate about a central axis of said conduit member, said turbine member having a substantially spherical shape having a top pole and a bottom pole, each of said vanes having a first end which is securely attached to said top pole and further having a second end which is securely attached to said bottom pole, said vanes being curved from said top pole to said bottom pole and essentially forming a body of said spherical object; and a means to drive said turbine member using solar energy including a plurality of solar panels securely mounted to an outer surface of said upper portion of said conduit member such that said plurality of solar panels are positioned upwardly and outwardly from said conduit member; a motor connected to said turbine member; and a battery connected to said motor for energizing said motor and connected to said solar panels for storing electrical energy, said turbine member being rotatably mounted upon said solar panels.

8. A solar-powered ventilation system for a building structure comprising:

a conduit member extending upwardly from said roof and having an opening therethrough, the conduit member having an upper portion and a lower portion, the upper portion having a substantially frusta-conical shape, the lower portion having a substantially cylindrical shape;

a turbine member having a central rotating spindle and a plurality of curved vanes securely attached to and spaced about said spindle, said turbine member being securely mounted on and above said conduit member, said spindle being disposed so as to rotate about a central axis of said conduit member, said turbine member having a substantially spherical shape having a top pole and a bottom pole, each of said vanes having a first end which is securely attached to said top pole and further having a second end which is securely attached to said bottom pole, said vanes being curved from said top pole to said bottom pole and essentially forming a body of said spherical object; and a means to drive said turbine member using solar energy including a plurality of solar panels securely mounted to an outer surface of said upper portion of said conduit member such that said plurality of solar panels are positioned upwardly and outwardly from said conduit member, said plurality of solar panels extending substantially continuously around said conduit member in a frusta-conical configuration, a motor connected to said turbine member, and a battery connected to said motor for energizing said motor and connected to said solar panels for storing electrical energy, said turbine member being rotatably mounted upon said solar panels.

9. A solar-powered ventilation system for a building structure as described in claim 8, wherein a perimeter wall of the upper portion of said conduit member is positioned at an angle of approximately 30 degrees with respect to a perimeter wall of the lower portion of said conduit member.

10. A solar-powered ventilation system for a building structure as described in claim 1, wherein a perimeter wall of the upper portion of said conduit member is positioned at an angle of approximately 30 degrees with respect to a perimeter wall of the lower portion of said conduit member.

11. A solar-powered ventilation system for a building structure as described in claim 1, wherein said plurality of solar panels extending substantially continuously around said conduit member in a frusta-conical configuration.

* * * * *